UNITED STATES PATENT OFFICE.

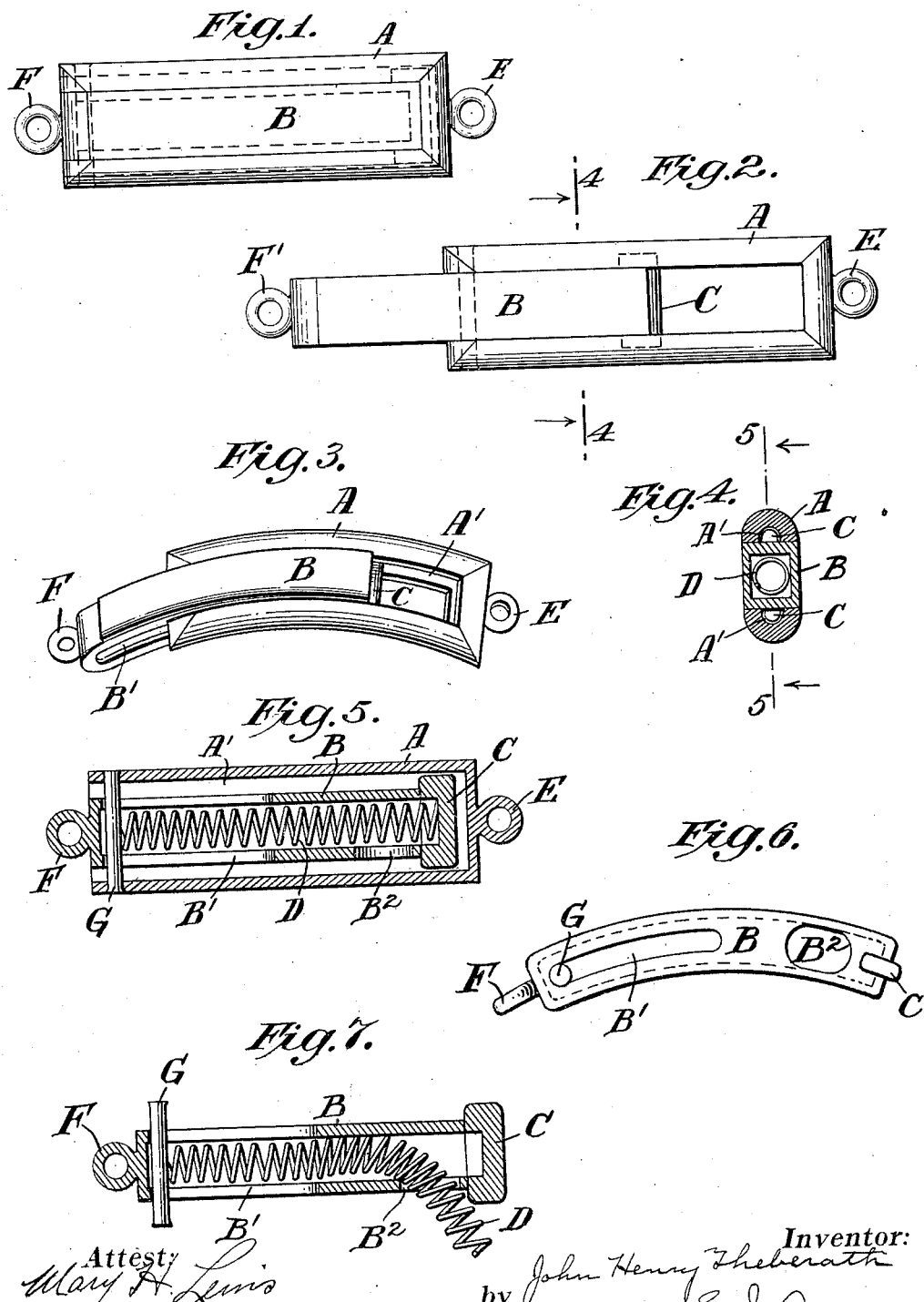

JOHN HENRY THEBERATH, OF SOUTH ORANGE, NEW JERSEY.

EXPANSIBLE METAL LINK.

1,090,581.          Specification of Letters Patent.     Patented Mar. 17, 1914.

Application filed October 2, 1912. Serial No. 723,461.

*To all whom it may concern:*

Be it known that I, JOHN HENRY THEBERATH, a citizen of the United States, and a resident of the village of South Orange, in the county of Essex and State of New Jersey, have invented certain new and useful Improvements in Expansible Metal Links, of which the following is a specification.

The improvements relate to expansible links adapted to be used in the manufacture of rings, bracelets, clasps, buckles and other articles and their objects are, among others, to produce an article of this character of simple, strong and durable construction and effective action which may be manufactured, altered or repaired at a minimum of cost for labor and materials, and which will be neat and attractive in appearance and will not be easily damaged or put out of adjustment in ordinary use.

The invention resides in the construction, combination and arrangement of parts hereinafter described and claimed and illustrated in the accompanying drawings.

In the said drawings, Figure 1 is a plan of an expansible link embodying the improvements; Fig. 2 is a similar view of the link in its expanded position; Fig. 3 is a perspective of the link in a partly expanded position; Fig. 4 is a transverse section substantially on the line 4—4 of Fig. 2 looking in the direction indicated by the arrows in that figure; Fig. 5 is a horizontal section substantially on the line 5—5 of Fig. 4 looking in the direction indicated by the arrows; Fig. 6 is a side view of the inner link member, and Fig. 7 is a horizontal medial section of the same.

The outer link member A is formed of a strip of metal U-shaped in cross-section and bent in rectangular form with the convex side of the strip of metal forming the link member on the outside and the concave side inside. This strip of metal forms two sides and one end of the said outer link member, and the other end is formed by the pin G running through said member. The opposite end is provided with a loop or eye E by which it may be connected to other links or to a chain or fastening means or other part as may be desired.

The inner link member B is hollow and substantially rectangular in cross-section. It fills the space between the two sides of the member A and is slightly rounded at its outer end, so as to form two sides and one end of said link member, and is provided at the said outer end with a loop F similar to the loop E. The other end of said member is formed by placing a notched disk C between the ends of the metal forming the outer sides thereof, and this disk extends beyond the link member at the end and two sides to form a projecting flange which works in the groove A' of the hollow walls of the member A. The sides of the member B are opened to form the slots B' in which the pin G works and the opening $B^2$ through which the spring D may be passed. The slot B' is of such diameter as to receive the pin G and prevent it from having lateral movement. Its length is sufficient to give the desired expansion, since it acts as a stop limiting the expansive movement and the resulting compression of the spring between the pin G and the end of the member B opposite said pin. The movement of the parts in the opposite direction is also checked by one end of the slot, and the parts are thus normally held, with the spring under compression, in such position that the link is entirely closed and presents the appearance of a solid non-expansible part. The external horizontal width of the member B corresponds with the internal horizontal width of the member A and the vertical diameters of the said parts are substantially the same, so that the link presents no material openings or irregularities.

The spring D is housed within the member B, and normally held in a compressed condition between the pin G and the end of said member opposite the pin as above described. The opening $B^2$ is large enough to permit the said spring to be inserted after the member B is completed so that it is not necessary to adjust or connect any of the parts in order to place it in position and secure it. This provision is equally advantageous when it is desired to remove the spring for any reason, since it may be removed and replaced, or another spring substituted, without disconnecting the parts forming the member B. While in use the spring will be held within the link member B by its own pressure, and if from any cause it should become broken or lose its elasticity it cannot accidentally protrude through the opening B² for the reason that the walls of the link member A cover said opening.

In assembling the link the two members A and B are first completed and the pin G then run through the slot B′ of the member B. The spring D is then passed into the interior of the member B and the said member placed inside the outer link member A by sliding the flanged head C and then the pin G through the open end of the hollow sides of the member A. The expansion of the metal of which this latter member is composed will be sufficient to permit the pin G to pass between its sides at the open end, and when the said pin reaches the openings provided for it adjacent that end it will immediately lodge in them and permit the end of the said member to contract again. The ends of the pin may then be upset to clench it in position and secure the parts firmly together.

The flanged head C of the link member B holds the inner end of that member in position and permits it to work in and out in order to give the desired expansion of the link. It also strengthens the hollow walls of the member A, and fills them at this point so as to prevent the lodgment of dirt therein, and when the link is slightly expanded the end portion of the flange closes the gap between the ends of the two members thus giving the article a neater appearance in this position and preventing anything from passing through and interfering with the retraction of the parts.

The link formed in the manner above described is of strong, durable and simple construction, presents a neat, compact and pleasing appearance to the eye, is certain and precise in action and dependable in operation and may be made in parts and assembled at a relatively small expense, the construction and arrangement of the parts being such that unskilled labor may be employed in the latter operation.

What I claim is:

1. The combination of an outer member of substantially U-shape form forming three sides of a hollow frame, with the concave portion inside, an inner member also of U-shape form with the concave portion in a plane at right angles to the concave portion of the outer member, a pin extending through the outer and inner members near one end, a flange at one end of the inner member extending beyond the same and entering the concave portion of the outer member, said inner member having a longitudinal opening through it through which said pin passes, a spring housed within the inner member between the pin and one of its ends and said inner member having a second opening in one side thereof near one end of greater diameter than the spring and adapted to permit the spring to be inserted or withdrawn therethrough, said openings of the inner member being normally covered by the outer member.

2. The combination of an outer member of open hollow form forming three sides of a frame with the opening of the hollow portion inside, an inner member also of hollow form, the inner member having slots in its sides, a pin secured at its ends to the outer member and passing through said slots, said slots extending part way of the length of the inner member, limiting the movement of said inner member on the pin and covered by the outer member, a flange projecting from three sides of the inner member and through the opening of the hollow portion of the outer member, a spring housed within said inner member between the pin and one end of said member, said spring adapted to be compressed when the inner member is moved on the pin and to normally hold the said inner member within the outer member and the said flange within said hollow portion.

3. The combination of an outer member of open hollow form forming three sides of a frame with the opening of the hollow portion inside, an inner member also of hollow form and having slots in its sides, a pin secured at its ends to the outer member and passing through said slots, said slots extending part way of the length of the inner member, limiting the movement of said inner member on the pin and covered by the outer member, a spring housed within said inner member between the pin and one end of said member, said spring adapted to be compressed when the inner member is moved on the pin and to normally hold the said inner member within the outer member, and said inner member having an opening in it of greater diameter than the spring adapted to permit the spring to be inserted or withdrawn therethrough.

4. An expansible link for bracelets, chains and other articles comprising an outer member of substantially U-shaped metal formed into a three-sided frame or border with the open side of said metal on the inside, an inner member filling the said frame or border composed of curved sheet metal pieces with their concave surfaces opposed, secured together at their ends and thus forming an elongated casing, a spring confined within said inner member and a pin secured to said outer and extending through said inner member, said member being provided with parallel longitudinal slots through which said pin extends so that the movement of the inner member longitudinally of the outer member is limited by the contact of said pin with the ends of said slots, and said inner member being provided with an opening of greater diameter than the spring extending a minor part of its length and permitting the insertion and withdrawal of said spring.

Witness my hand this 26th day of September, 1912, at the city of New York, in the county and State of New York.

JOHN HENRY THEBERATH.

Witnesses:
GEORGE L. FROST,
A. L. WOODLAND.